(12) United States Patent
Ozeki (10) Patent No.: US 12,535,794 B2
(45) Date of Patent: Jan. 27, 2026

(54) CONTROL DEVICE

(71) Applicant: Fanuc Corporation, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 345 days.

(21) Appl. No.: 18/035,178

(22) PCT Filed: Nov. 17, 2021

(86) PCT No.: PCT/JP2021/042255
§ 371 (c)(1),
(2) Date: May 3, 2023

(87) PCT Pub. No.: WO2022/107817
PCT Pub. Date: May 27, 2022

(65) Prior Publication Data
US 2024/0012385 A1    Jan. 11, 2024

(30) Foreign Application Priority Data
Nov. 20, 2020   (JP) .................................. 2020-193516

(51) Int. Cl.
*G05B 19/409*    (2006.01)

(52) U.S. Cl.
CPC .. *G05B 19/409* (2013.01); *G05B 2219/31439* (2013.01); *G05B 2219/32398* (2013.01)

(58) Field of Classification Search
None
See application file for complete search history.

(56) References Cited

U.S. PATENT DOCUMENTS

| 8,706,848 B2 | 4/2014 | Shouno |
| 2006/0212554 A1* | 9/2006 | Shouno ................... H04L 41/08 709/221 |

(Continued)

FOREIGN PATENT DOCUMENTS

| CN | 109196430 A | 1/2019 |
| JP | 06119021 A | 4/1994 |

(Continued)

OTHER PUBLICATIONS

International Search Report and Written Opinion for International Application No. PCT/JP2021/042255, dated Feb. 8, 2022, 5 pages.

(Continued)

*Primary Examiner* — Ryan A Jarrett
(74) *Attorney, Agent, or Firm* — BUCHANAN INGERSOLL & ROONEY PC (57) ABSTRACT

A control device includes a setting detection unit that detects a setting operation on a value of a setting item related to control of the industrial machine and a notification unit configured to notify information related to the setting operation. The setting detection unit can detect a setting operation caused by execution of an MDI program, a setting operation caused by execution of a machining program, a setting operation caused by an external signal, and a setting operation caused by a higher-level management server. The notification unit provides a notification using a guidance message, a popup window, voice, an external signal, or information transmission via a network.

6 Claims, 10 Drawing Sheets

(56) References Cited

U.S. PATENT DOCUMENTS

2019/0294148 A1    9/2019  Satou et al.
2020/0241501 A1*   7/2020  Nakanishi .............. G06Q 50/04

FOREIGN PATENT DOCUMENTS

| | | |
|---|---|---|
| JP | 2006262409 A | 9/2006 |
| JP | 2015-118588 A | 6/2015 |
| JP | 2019-008353 A | 1/2019 |
| JP | 2019168994 A | 10/2019 |
| KR | 10-2014-0050176 A | 4/2014 |
| WO | 2016/181450 A1 | 11/2016 |

OTHER PUBLICATIONS

Office Action (The First Office Action) issued Apr. 18, 2025, by the State Intellectual Property Office of People's Republic of China in corresponding Chinese Patent Application No. 202180076415.5 and an English translation of the Office Action. (16 pages).

* cited by examiner

Tool offset

| No. | Name | Tool length | | Tool size (diameter) | |
|---|---|---|---|---|---|
| | | Shape | Abrasion | Shape | Abrasion |
| 1 | | 3.2534 | 0.0000 | 0.0000 | 0.0000 |
| 2 | | 0.0000 | 0.0000 | 0.0000 | 0.0000 |
| 3 | | 0.0000 | 0.0000 | 0.0000 | 0.0000 |
| 4 | | 0.0000 | 0.0000 | 0.0000 | 0.0000 |
| 5 | | 0.7869 | 0.0000 | 0.0000 | 0.0000 |
| 6 | | 0.0000 | 0.0000 | 0.0000 | 0.0000 |
| 7 | | 0.0000 | 0.0000 | 0.0000 | 0.0000 |
| 8 | | 0.0000 | 0.0000 | 0.0000 | 0.0000 |
| 9 | | 0.0000 | 0.0000 | 0.0000 | 0.0000 |
| 10 | | 0.0000 | 0.0000 | 0.0000 | 0.0000 |
| 11 | | 0.0000 | 0.0000 | | 0.0000 |
| 12 | | 0.0000 | | | 0.0000 |
| 13 | | 0.0000 | | | 0.0000 |

Please enter a numerical value (Entry range: −9999.999999~9999.999999)

FIG. 10

CONTROL DEVICE

CROSS REFERENCE TO RELATED APPLICATIONS

This is the U.S. National Phase application of PCT/JP2021/042255, filed Nov. 17, 2021, which claims priority to Japanese Patent Application No. 2020-193516, filed Nov. 20, 2020, the disclosures of these applications being incorporated herein by reference in their entireties for all purposes.

FIELD OF THE INVENTION

The present invention relates to a control device.

BACKGROUND OF THE INVENTION

When an industrial machine such as a machine tool or a robot is controlled by a control device, values of setting items such as parameters or tool data required for controlling the industrial machine are set on the control device. Examples of the setting items may be a workpiece coordinate value, a feed rate, a gain value, an offset value, and the like. A setup screen implemented to the control device is displayed, and such setting items are then set to suitable setting values by an operator on the setup screen in accordance with the specification of the industrial machine to be controlled or details of a control operation to be performed (Patent Literature 1 and the like).

In such a setup screen, when a setting operation on a value of a setting item is normally made, this is notified by a message on the screen or the like. In contrast, when a setting operation on a value of a setting item is not normally made, for example, when the form of a setting value is incorrect, when the setting value is out of a predefined setting available range, when a value cannot be set because the value is inconsistent with a value set for another setting item, or the like, the failure of the setting is notified by, for example, a message on the screen.

On the other hand, there are also methods for setting a setting item for control other than the method using the setup screen described above. For example, when an MDI (manual data input) program is used to measure workpiece coordinates and a tool offset by measuring cycles, an instruction such as a G2025 instruction, a G10 instruction, or the like may be used to directly set a value of a setting item without via a setup screen. When a value of a setting item is set by using such a method, a message indicating whether or not a setting value has been successfully set is not notified on an execution window of the MDI program. The same applies to a case where a value is set by a so-called machining program or the like.

Further, when a value of a setting item is changed in accordance with input of an external signal, a message indicating that the value of the setting item has been set by the signal is not notified on the screen of a control device viewed by an operator working in a site.

Furthermore, in a case where a plurality of industrial machines installed in a factory are connected to a higher-level management computer via a network, a setting operation on values of setting items may be performed via the network on a control device, which controls each industrial machine, based on a production plan prepared by the management computer. Also in such a case, the message indicating that values of setting items have been set is not notified on the screen of the control device viewed by an operator working in a site.

PATENT LITERATURE

Patent Literature 1: Japanese Patent Application Laid-Open No. H06-119021

SUMMARY OF THE INVENTION

As discussed above, when a value of a setting item of a control device has been set by some means other than a setup screen, an operator who is operating the control device is unable to check whether or not the setting operation has been correctly performed. Thus, for example, when a setting operation has been performed by using an MDI program, it is required for the operator to call a setup screen that enables check of the set item and then check the set value. Such an operation is troublesome for the operator and undesirably causes a longer working time.

Further, when a setting operation has been performed by using an external signal, a higher-level management computer, or the like, the operator may even be unaware of the fact that the setting operation has been performed. Then, as a result of the operator starting operation of an industrial machine without knowing that a value of a setting item has been changed, the industrial machine may perform an unexpected operation, and this may cause a failure or the like.

Thus, there is a demand for a mechanism in which information related to a change in a setting item can be checked even on a screen that does not display information related to a setting operation.

In the control device for controlling an industrial machine, a control device according to the present invention solves the above-mentioned problem by monitoring a setting operation on a setting item related to control of the industrial machine and, in response to detecting a setting operation on a value of a setting item, notifying the operator of information related to the setting operation on the value of the setting item. Such a notification may include information on a name of an item on which the setting operation has been performed, a set value, success/failure of the setting operation, a source of an update request for the setting, or the like. Further, the notification may be provided through display of a guidance message on a currently displayed screen, guidance voice, an external signal, transmission of information via a network, or the like.

Further, one aspect of the present invention is a control device for controlling an industrial machine, and the control device includes: a setting detection unit configured to detect a setting operation on a value of a setting item related to control of the industrial machine; and a notification unit configured to notify information related to the setting operation.

According to one aspect of the present invention, when a value of a setting item is changed, since information related to the change in the setting item is notified as guidance even on a screen that does not display information related to the setting operation, the operator is able to check the change without transiting the screen. This reduces operator's workload and improves visibility of an operation related to the setting.

DETAILED DESCRIPTION OF EMBODIMENTS OF THE INVENTION

Embodiments of the present invention will be described below with reference to the drawings.

Figure 1:
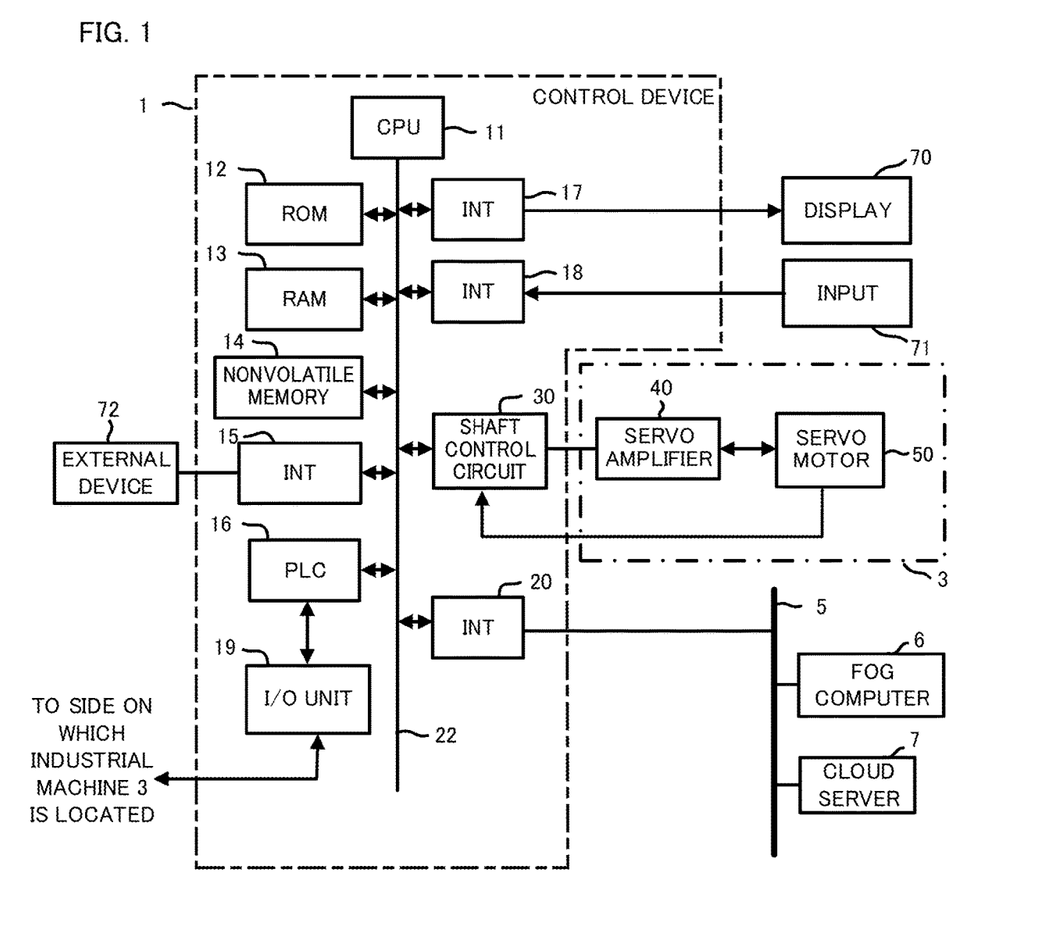
FIG. 1 is a schematic diagram of a hardware configuration of a control device according to a first embodiment.

FIG. 1 is a schematic diagram of a hardware configuration illustrating the main part of a control device according to a first embodiment of the present invention. A control device 1 of the present invention can be implemented as a control device for controlling an industrial machine 3 based on a control program, for example.

A CPU 11 of the control device 1 according to the present embodiment is a processor that controls the control device 1 as a whole. The CPU 11 reads a system program stored in a ROM 12 via a bus 22 and controls the overall control device 1 in accordance with the system program. A RAM 13 temporarily stores temporary computation data and display data, various data that are externally input, and the like.

A nonvolatile memory 14 is formed of a memory, a solid state drive (SSD), or the like backed up by a battery (not shown), for example, and the storage state is held even when the control device 1 is powered off. The nonvolatile memory 14 stores a control program or data loaded from an external device 72 via an interface 15, a control program or data input from an input device 71 via an interface 18, a control program or data acquired from other machines such as a fog computer 6 and a cloud server 7 via a network 5, and the like. For example, the data stored in the nonvolatile memory 14 may include data related to a position, a speed, an acceleration, and a load of each motor in the industrial machine 3, and data related to each physical quantity sensed by a sensor (not shown) attached to other industrial machines 3. The control program or data stored in the nonvolatile memory 14 may be loaded into the RAM 13 when executed or used. Further, in the ROM 12, various system programs such as a known analysis program are written in advance.

The interface 15 is an interface for connecting the CPU 11 in the control device 1 and the external device 72 in the external storage medium or the like to each other. For example, a control program, setup data, and the like used for control of the industrial machine 3 are loaded from the side of the external device 72. Further, a control program, setup data, or the like compiled inside the control device 1 can be stored in an external storage medium such as a CF card or a USB memory (not shown) via the external device 72. A PLC (programmable logic controller) 16 executes a ladder program to output a signal to the industrial machine 3 and peripheral devices of the industrial machine 3 (for example, a tool changer, an actuator such as a robot, and a sensor such as a temperature sensor and a humidity sensor attached to the industrial machine 3) via an I/O unit 19 and control the same. Further, the PLC 16 receives signals from various switches of an operation panel, the peripheral devices, and the like deployed to the body of the industrial machine 3, performs necessary signal processing thereon, and then passes the signals to the CPU 11.

An interface 20 is an interface for connecting the CPU in the control device 1 and the wired or wireless network 5 to each other. For example, the network 5 may perform communication by using a technology such as serial communication of RS-485 or the like, Ethernet (registered trademark) communication, optical communication, a wireless LAN, Wi-Fi (registered trademark), or Bluetooth (registered trademark). Higher-level management computers such as another machine, the fog computer 6, the cloud server 7, and the like are connected to the network 5 and transfer data to and from the control device 1 with each other.

On the display 70, each data loaded on the memory, data obtained as a result of execution of a program or the like, and the like are output via an interface 17 and displayed. Further, the input 71 formed of a keyboard, a pointing device, and the like passes an instruction, data, or the like based on an operator's operation via the interface 18 to the CPU 11.

A shaft control circuit 30 for controlling one or more shafts in the industrial machine 3 receives a motion instruction value for a shaft from the CPU 11 and outputs an instruction for the shaft to a servo amplifier 40, respectively. The servo amplifier 40 receives this instruction and drives a servo motor 50 for moving a drive unit of the industrial machine 3 along a shaft, respectively. The servo motor 50 for a shaft has a built-in position and speed detector (not shown) and feeds a position and speed feedback signal from the position and speed detector back to the shaft control circuit 30, respectively, to perform feedback control on the position and speed. Note that, although only a single shaft control circuit 30, only a single servo amplifier 40, and only a single servo motor 50 are illustrated in the hardware configuration diagram of FIG. 1, these components are each prepared for the number of shafts in the industrial machine 3 to be controlled in the actual implementation.

Figure 2:
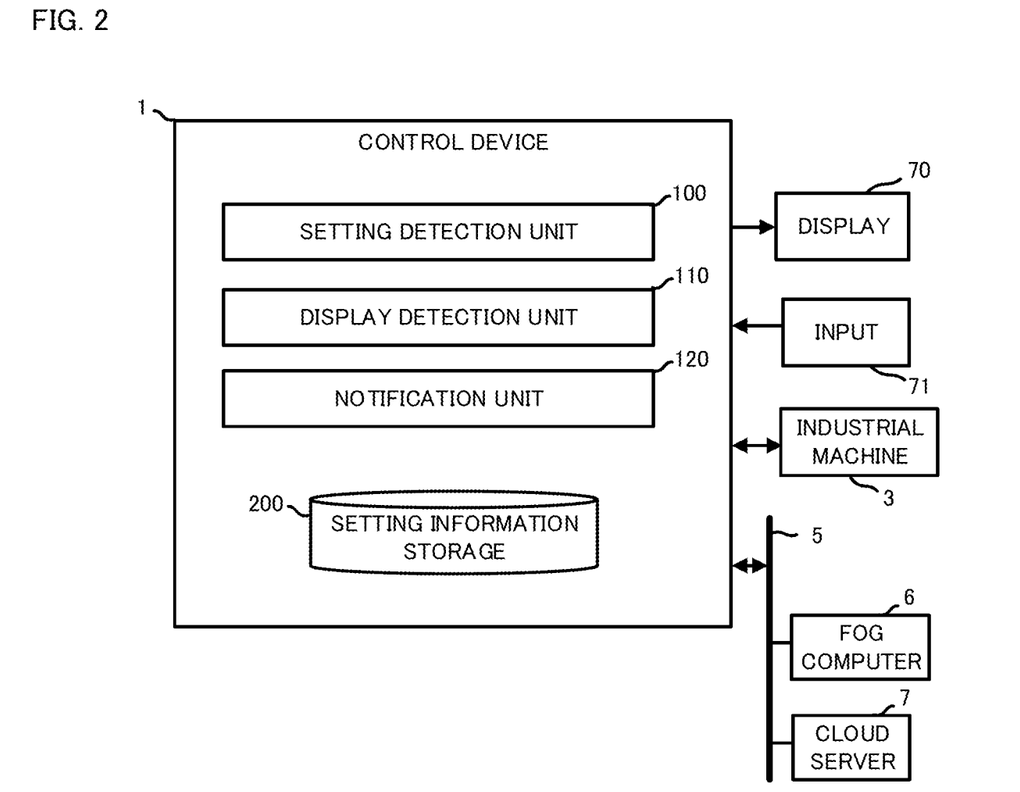
FIG. 2 is a schematic block diagram illustrating functions of the control device according to the first embodiment.

FIG. 2 illustrates functions of the control device 1 according to the first embodiment of the present invention as a schematic block diagram. Each function of the control device 1 according to the present embodiment is implemented when the CPU 11 in the control device 1 shown in FIG. 1 executes a system program to control the operation of each component of the control device 1.

The control device 1 of the present embodiment includes a setting detection unit 100, a display detection unit 110, and a notification unit 120. Further, a setting information storage unit 200 that is an area to store values set for respective setting items in the control device 1 is provided in the RAM 13 and the nonvolatile memory 14 in the control device 1.

The setting detection unit 100 is implemented when the CPU 11 in the control device 1 illustrated in FIG. 1 executes a system program which is read from the ROM 12 to cause a calculation process using the RAM 13 and the nonvolatile memory 14 mainly performed by the CPU 11 to take place. The setting detection unit 100 detects a setting operation on a value of a setting item related to control of the industrial machine. For example, the setting detection unit 100 monitors an update request (a request for writing, change, or the like) on a value of a setting item directed to the setting information storage 200. The update request on a value of a setting item may be transmitted via various routes such as via instructions from an MDI program or a machining program, via an external signal, via an instruction routed via a network from another device such as a management device, and the like in addition to being provided from a setup screen. Since update of a value of a setting item itself is performed by a common processing program, however, by monitoring the operation of the processing program, it is possible to easily monitor an update request on a setting item value directed to the setting information storage 200.

When an update request directed to the setting information storage unit 200 is detected, the setting detection unit 100 acquires information related to a setting operation, such as a name of an item on which the setting operation has been performed, a set value, success/failure of a setting operation, a source of a setting update request, or the like based on the content of the update request and a response to the update request. The information related to the setting operation acquired by the setting detection unit 100 is notified to the notification unit 120.

The display detection unit 110 is implemented when the CPU 11 in the control device 1 shown in FIG. 1 executes a system program read from the ROM 12 to cause a calculation process using the RAM 13 and the nonvolatile memory 14 mainly performed by the CPU 11 and an input/output process using the interface 17 and the like to take place. The display detection unit 110 monitors whether or not display related to update of a value of a setting item detected by the setting detection unit 100 is provided on a display screen of the display device 70. Then, when the displaying related to update is not provided, this is notified to the notification unit 120.

The notification unit 120 is implemented when the CPU 11 in the control device 1 shown in FIG. 1 executes a system program read from the ROM 12 to cause a calculation process using the RAM 13 and the nonvolatile memory 14 mainly performed by the CPU 11 and an input/output process using the interface 17 and the like to take place. The notification unit 120 externally notifies information related to a setting operation on a setting item notified from the setting detection unit 100. The notification unit 120 may provide a notification of information related to a setting operation by, for example, displaying a guidance message on display screen of the display device 70.

Figure 3:
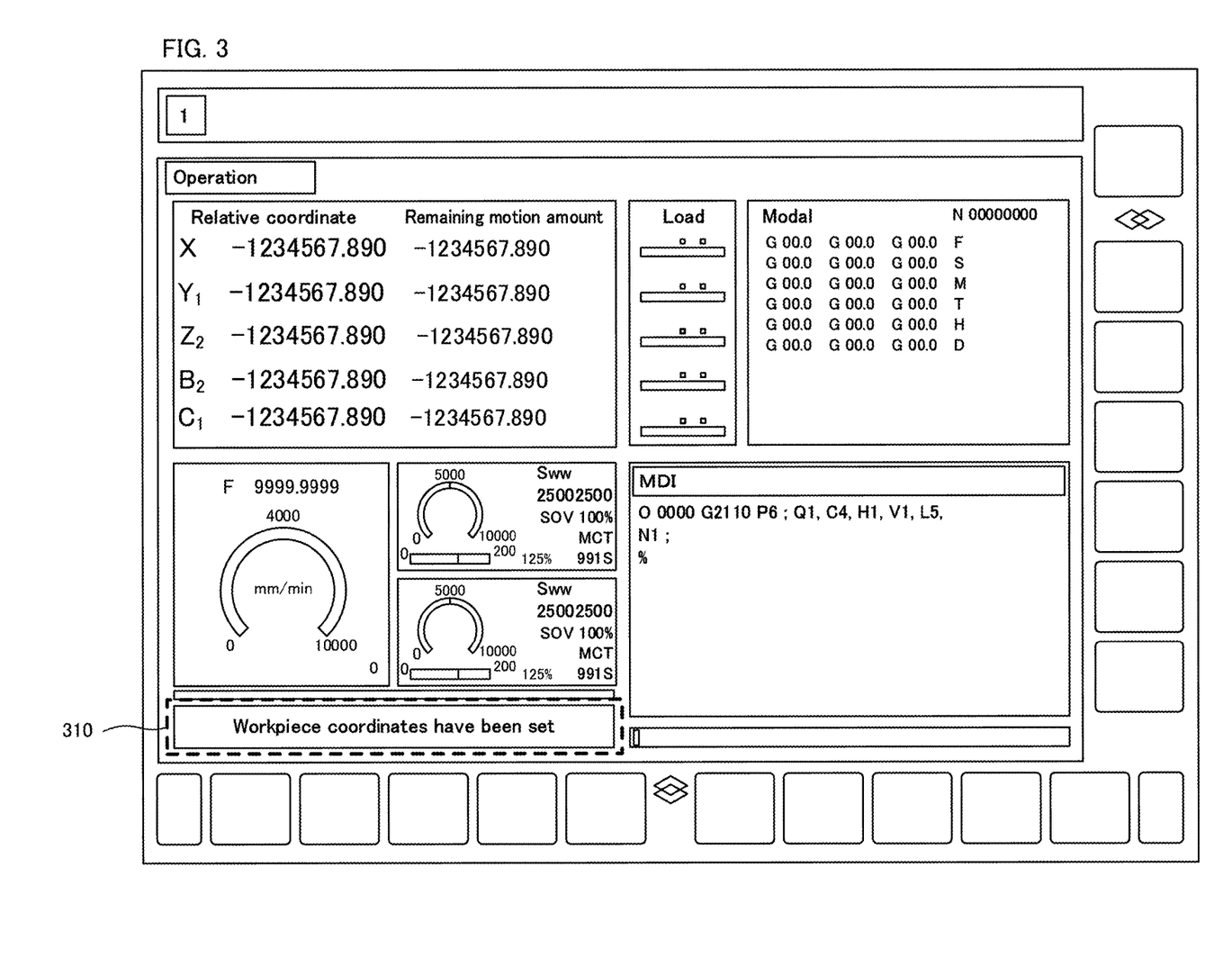
FIG. 3 is a diagram illustrating an example of a notification using a guidance message.

FIG. 3 illustrates an example of providing the notification using a guidance message. In the example of FIG. 3, a guidance message 310 is displayed on a typical MDI screen, and thereby the operator is notified that a value of a setting item has been updated. The notification unit 120 may provide a notification of the information related to the setting operation by, for example, displaying a popup window on a display screen of the display device 70.

Figure 4:
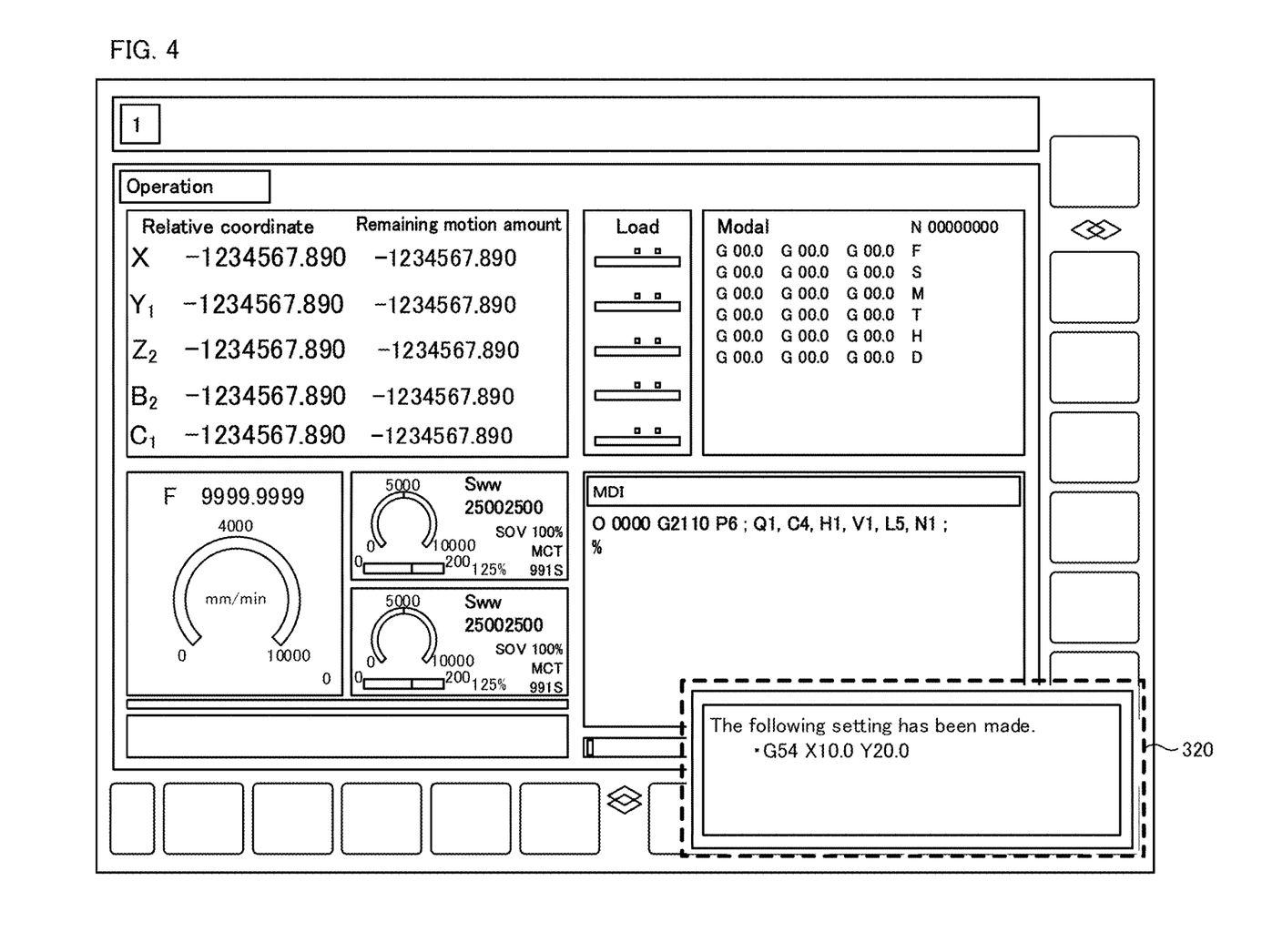
FIG. 4 is a diagram illustrating an example of a notification using a popup window.

FIG. 4 illustrates an example of providing the notification using a popup window. In the example of FIG. 4, a popup window 320 is displayed on a typical MDI screen, and thereby the operator is notified of the detail of update of a value of a setting item. By using a popup window for the notification, it is possible to notify the operator of more information. Besides the above, the notification unit 120 may output voice guidance to notify the operator of the information related to the setting operation, for example. The notification unit 120 may use a notification sound or a lamp and the like together with the above. Further, a notification using an external signal, output to an external file, or information transmission via the network 5 may be provided.

Furthermore, in accordance with the notification content provided by the display detection unit 110, the notification unit 120 may determine whether or not to provide a notification of information related to a setting operation. For example, the notification unit 120 may notify information related to a setting operation on a setting item only when the display detection unit 110 detects that no displaying related to update of a value of a setting item is provided. This can suppress a redundant notification, for example, because no notification is performed by the notification unit 120 when the setup screen is active and a setting operation is being performed thereon, but a notification of information related to a setting operation on a setting item is provided only when an update request on a setting item is provided in response to instructions from an MDI program or a machining program, an external signal, a higher-level management device, or the like.

In the control device 1 having the above configuration, when a value of a setting item is changed, since information related to a change of a setting item is notified as guidance even with a screen that does not display the information related to the setting operation, the operator is able to make confirmation without transiting the screen. This reduces operator's workload and improves visibility of an operation related to the setting.

Figure 5:
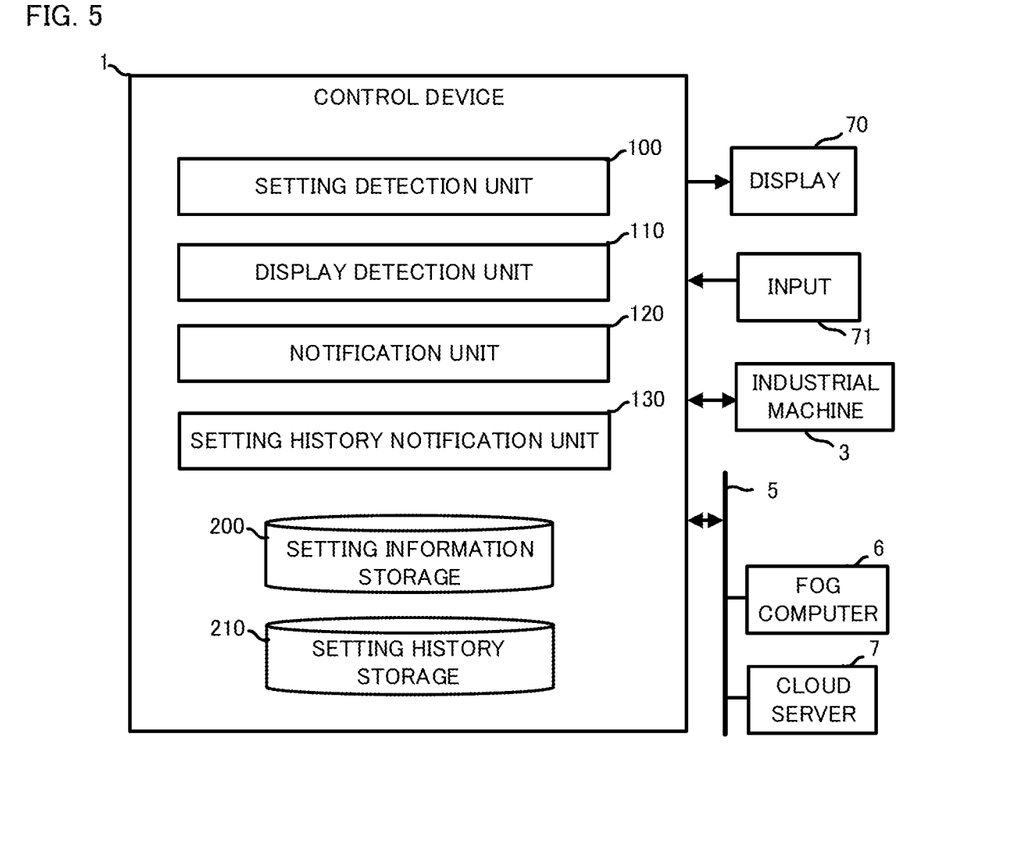
FIG. 5 is a schematic block diagram illustrating functions of the control device according to a second embodiment.

FIG. 5 illustrates functions of the control device 1 according to a second embodiment of the present invention as a schematic block diagram. Each function of the control device 1 according to the present embodiment is implemented when the CPU 11 in the control device 1 shown in FIG. 1 executes a system program to control the operation of each component of the control device 1.

The control device 1 of the present embodiment further includes a setting history notification unit 130 in addition to the setting detection unit 100, the display detection unit 110, and the notification unit 120. Further, the setting information storage unit 200 that is an area to store values set for respective setting items in the control device 1 and a setting history storage unit 210 that is an area to store histories of setting operations on values of setting items made in the past are provided in the RAM 13 and the nonvolatile memory 14 of the control device 1.

Once detecting a setting operation on a value of a setting item related to control of an industrial machine, the setting detection unit 100 according to the present embodiment stores the acquired information related to the setting operation in the setting history storage unit 210 as a history. In the setting history storage unit 210, information related to a setting operation acquired by the setting detection unit 100 is stored in association with information on a date and time the update request was made or the like. The remaining functions of the setting detection unit 100 and the functions of the display detection unit 110 and the notification unit 120 are similar to those in the first embodiment.

The setting history notification unit 130 is implemented when the CPU 11 in the control device 1 shown in FIG. 1 executes a system program read from the ROM 12 to cause a calculation process using the RAM 13 or the nonvolatile memory 14 mainly performed by the CPU 11 and an input/output process using the interface 17 and the like to take place. The setting history notification unit 130 notifies a history of information related to a setting operation stored in the setting history storage 210.

Figure 6:
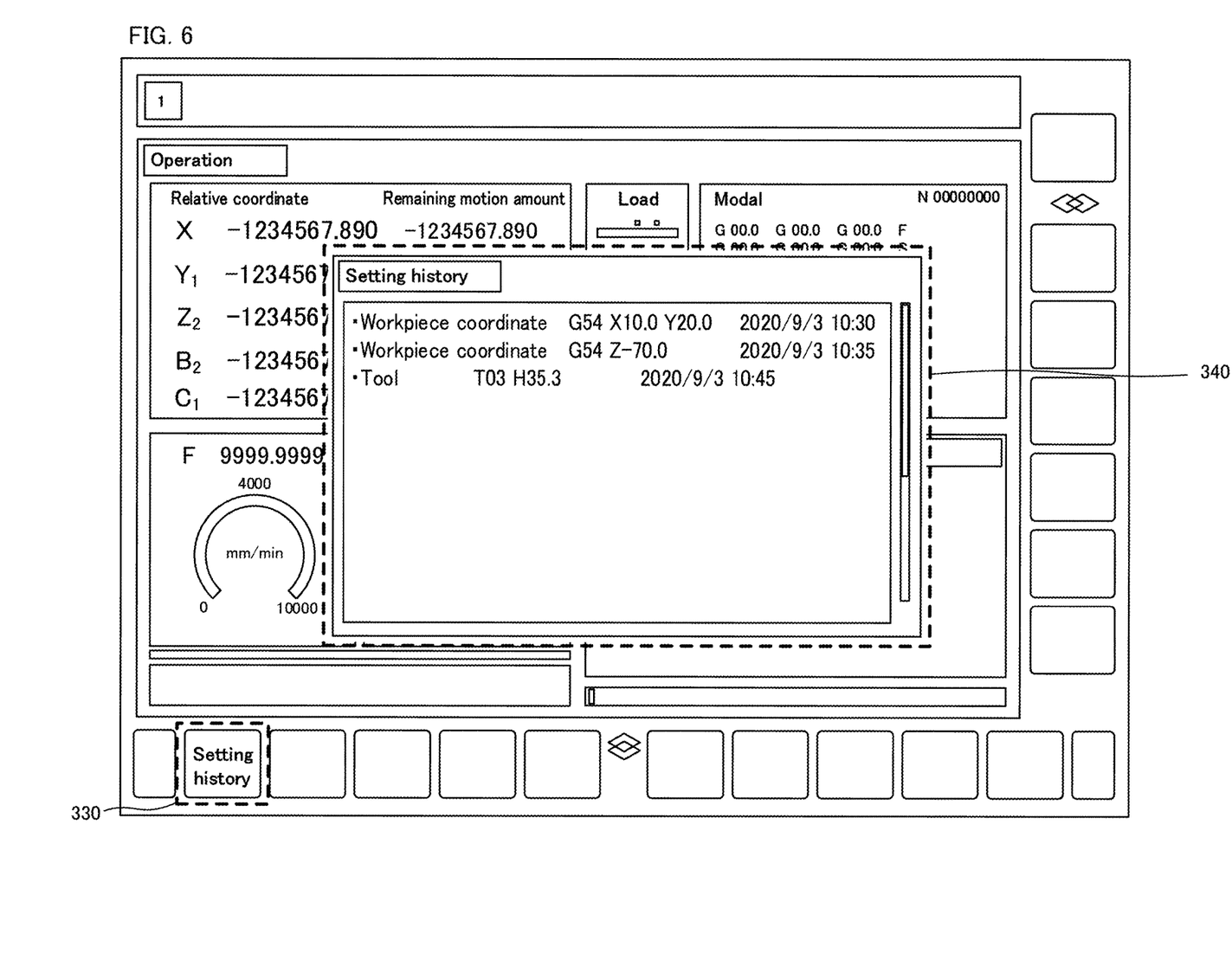
FIG. 6 is a diagram illustrating a display example of a setting history.

FIG. 6 illustrates an example in which the history of information related to setting operations is notified on the display screen of the display device 70. For example, in response to a touch operation on a softkey 330 of "Setting history" displayed on the display screen, the setting history notification unit 130 reads a predetermined number of histories related to the most recent setting operations from the setting history storage unit 210 and displays the histories sorted by date and time in a setting history window 340. This display enables the operator to check settings that have been made so far backward in a time-series manner and thus check whether or not there is omission of a setting, up to what part the setting has been completed, whether or not a setting other than settings made by himself/herself has been made, and the like.

Figure 7:
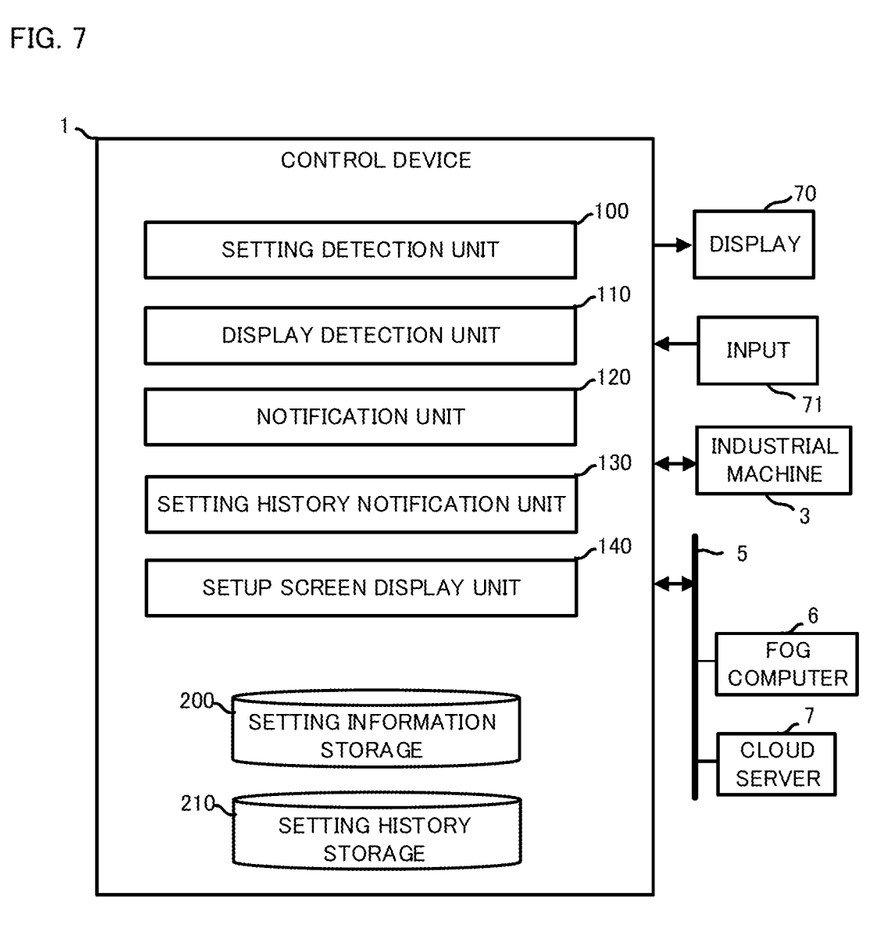
FIG. 7 is a schematic block diagram illustrating functions of the control device according to a third embodiment.

FIG. 7 illustrates functions of the control device 1 according to a third embodiment of the present invention as a schematic block diagram. Each function of the control device 1 according to the present embodiment is implemented when the CPU 11 in the control device 1 shown in FIG. 1 executes a system program to control the operation of each component of the control device 1.

The control device 1 of the present embodiment further includes a setup screen display unit 140 in addition to the setting detection unit 100, the display detection unit 110, the notification unit 120, and the setting history notification unit 130. Further, the setting information storage 200 that is an area to store values set for respective setting items in the control device 1 and the setting history storage 210 that is an area to store histories of setting operations on values of setting items made in the past are provided in the RAM 13 and the nonvolatile memory 14 in the control device 1.

The functions of the setting detection unit 100, the display detection unit 110, the notification unit 120, and the setting history notification unit 130 according to the present embodiment are similar to those in the second embodiment.

The setup screen display unit 140 is implemented when the CPU 11 in the control device 1 shown in FIG. 1 executes a system program read from the ROM 12 to cause a calculation process using the RAM 13 and the nonvolatile memory 14 mainly performed by the CPU 11 and an input/output process using the interface 17 and the like to take place. Once information related to a setting operation indicated by a setting history notified by the setting history notification unit 130 is selected, the setup screen display unit 140 displays, on the display screen of the display device 70, a setup screen used for performing a setting operation on a setting item that has been set in accordance with the information related to the setting operation.

Figure 8:
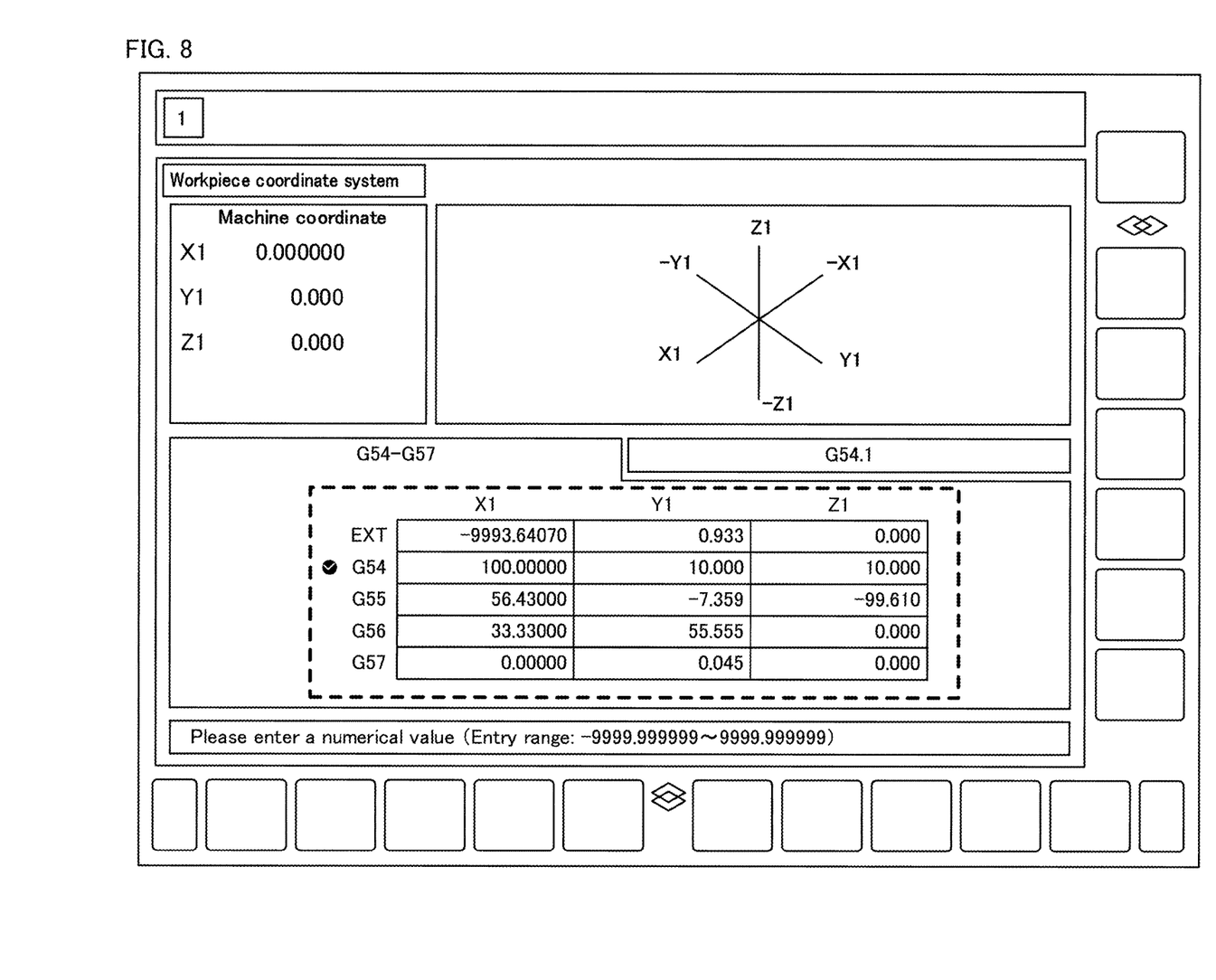
FIG. 8 is a diagram illustrating a display example of a workpiece coordinate setup screen.
Figure 9:
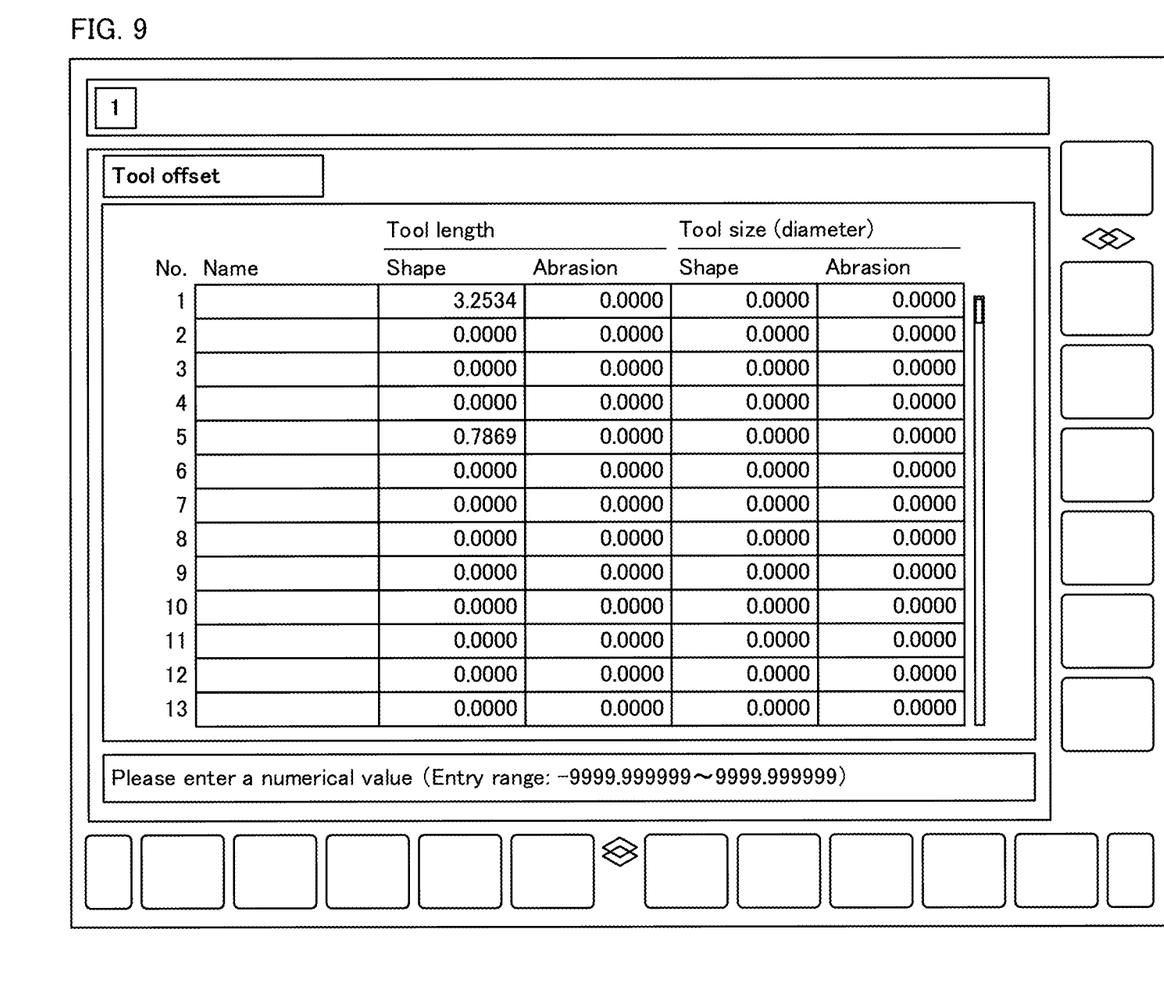
FIG. 9 is a diagram illustrating a display example of a tool offset setup screen.
Figure 10:
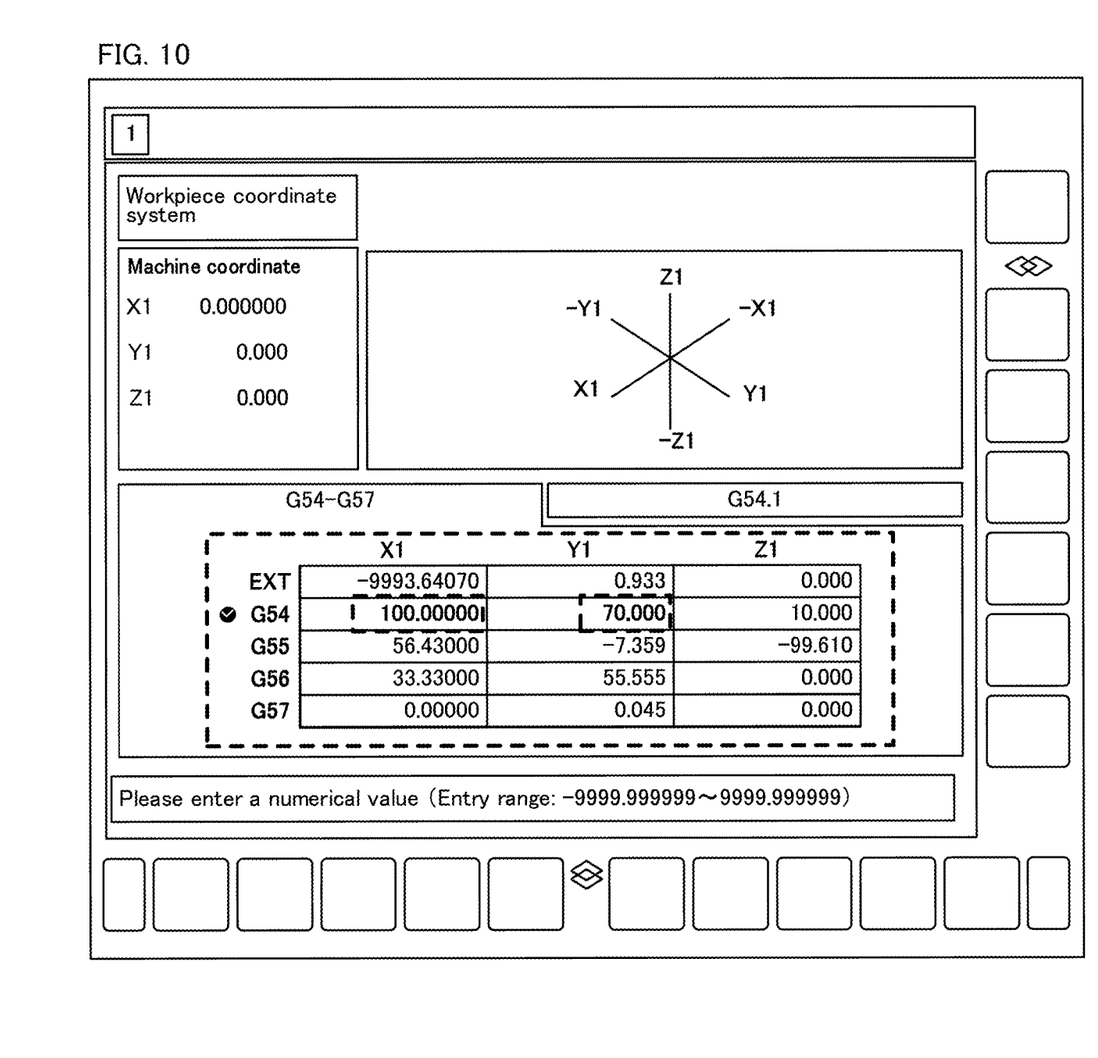
FIG. 10 is a diagram illustrating a display example of a workpiece coordinate setup screen in which values of setting items are highlighted.

For example, in the setting history window 340 exemplified in FIG. 6, once the information related to the setting operation made when workpiece coordinates were set is selected, a workpiece coordinate setup screen as exemplified in FIG. 8 is displayed. Similarly, in the setting history window 340 exemplified in FIG. 6, once the information related to the setting operation made when a tool offset was set is selected, a tool offset setup screen as exemplified in FIG. 9 is displayed. When displaying the setup screen, the setup screen display unit 140 may highlight a value of a setting item updated with the selected setting related information. For example, in FIG. 6, when information related to a setting operation of "Workpiece coordinates G54 X10.0 Y20.0 2020/9/3 10:30" is selected, the portions associated with the X-axis and the Y-axis for the workpiece coordinates set by the G54 instruction may be highlighted, as exemplified in FIG. 10.

With such a configuration being provided, it is possible to directly call a setup screen used in checking and updating each information related to a setting operation from a notification of a setting history, and it is thus possible to perform confirmation, modification, and the like on the setting through a simple operation. Further, since an item associated with the information related to the setting operation in a selected history is highlighted in the displayed setup screen, this enables the operator to easily understand which item to pay attention to, and improvement on the efficiency of work related to the setting is expected.

Although one of embodiments of the present invention has been described above, the present invention is not limited to only the example of the embodiments described above and can be implemented in various forms with addition of suitable modification.

LIST OF REFERENCE SYMBOLS 1 control device
3 industrial machine
5 network
6 fog computer
7 cloud server
11 CPU
12 ROM
13 RAM
14 nonvolatile memory
17, 18, 20 interface
16 PLC
19 I/O unit
22 bus
30 shaft control circuit
40 servo amplifier
50 servo motor
70 display
71 input
72 external device
100 setting detection unit
110 display detection unit
120 notification unit
130 setting history notification unit
140 setup screen display unit
200 setting information storage
210 setting history storage

The invention claimed is:

1. A control device for controlling an industrial machine, the control device comprising a processor configured to:
   detect a setting operation on a value of a setting item related to control of the industrial machine;
   provide notification information related to the setting operation; and
   detect whether or not the information related to the setting operation detected by the processor is displayed on a display screen of the control device,
   wherein when the processor detects that the information related to the setting operation is not displayed on the display screen, the processor provides the notification information related to the setting operation on the display screen.

2. The control device according to claim 1, wherein the notification using the displaying is at least any of a displaying of a guidance message and a displaying with a popup window.

3. The control device according to claim 1, wherein the setting operation detected by the processor is at least any of a setting operation caused by execution of an MDI program, a setting operation caused by execution of a machining program, a setting operation caused by an external signal, and a setting operation caused by a higher-level computer via a network.

4. The control device according to claim 1 further comprising a memory configured to:

store a history of the information related to the setting operation detected by the processor; and wherein the processor is further configured to display at least one history of the information related to the setting operation stored in the memory.

5. The control device according to claim 4, wherein the processor is further configured to receive, from an operator, a selection of one history of the information related to the setting operation from the displayed at least one history of the information related to the setting operation, and display a setup screen, wherein the operator sets a setting item in accordance with the information related to the setting operation in the selected history via the setup screen.

6. The control device according to claim 5, wherein the processor highlights a setting value set in accordance with the information related to the setting operation in the setup screen.

* * * * *